United States Patent [19]
Reebs

[11] Patent Number: 4,785,664
[45] Date of Patent: Nov. 22, 1988

[54] ULTRASONIC SENSOR

[75] Inventor: Stephen R. Reebs, Bellevue, Wash.

[73] Assignee: Kay-Ray, Inc., Arlington Heights, Ill.

[21] Appl. No.: 856,812

[22] Filed: Apr. 28, 1986

[51] Int. Cl.$^4$ ............................................. G01F 23/00
[52] U.S. Cl. .................................. 73/290 V; 340/621; 367/908
[58] Field of Search .................. 73/290 R, 290 V; 340/621; 367/901, 908, 127, 124, 115, 114, 99

[56] References Cited

U.S. PATENT DOCUMENTS

| | | | |
|---|---|---|---|
| 2,755,455 | 7/1956 | Gordon, Jr. | 367/114 |
| 3,115,615 | 12/1963 | Saper | 73/290 V |
| 4,050,057 | 9/1977 | Backman, Jr. et al. | 367/115 |
| 4,121,094 | 10/1978 | Di Vito et al. | 367/908 |
| 4,210,969 | 7/1980 | Massa | 367/908 |
| 4,578,997 | 4/1986 | Soltz | 73/290 V |
| 4,644,513 | 2/1987 | Czajkowski | 367/108 |
| 4,675,854 | 6/1987 | Lau | 367/908 |

FOREIGN PATENT DOCUMENTS

| | | | |
|---|---|---|---|
| 3032177 | 3/1982 | Fed. Rep. of Germany | 73/290 V |
| 3205425 | 8/1983 | Fed. Rep. of Germany | 367/115 |

Primary Examiner—William A. Cuchlinski, Jr.
Assistant Examiner—W. Morris Worth
Attorney, Agent, or Firm—Kinney & Lange

[57] ABSTRACT

An improved ultrasonic system for detecting the level of a material that has a surface, for example a liquid level inside of a tank, which improves the ability to detect levels particularly when the tank is nearly full. A transmitted ultrasonic signal from a transducer is reflected against the material in the tank, and when received back at the transducer, an output pulse is provided from the transducer. The distance or level is determined by determining the time between the transmission and the reflected signal. A comparator compares the signal from the transducer with a reference and provides an output when a pulse of greater magnitude than the reference is received. In order to avoid problems of high output signals caused by vibration of the transducer after a control signal is removed until the transducer reaches rest (called "ring down" time), the reference signal is adjusted on a time basis so that it initially will be above the expected level of any unwanted "ring down" signal, but it will recognize a valid reflected signal when the tank level is close to full because the reflected signal also will have a high magnitude, and the reference signal will decrease with time to a desired level where lower magnitude reflected signals associated with lower tank levels will be properly identified.

6 Claims, 2 Drawing Sheets

ULTRASONIC SENSOR

BACKGROUND OF THE INVENTION

1. Field of the Invention.

The present invention relates to ultrasonic transducer systems for detecting distances to an ultrasonic reflecting surface, such as a system used for detecting levels of materials in a tank.

2. Description of the Prior Art.

Various ultrasonic distance measuring and level measuring systems have been advanced in the prior art, and in general the control of electroacoustic transducers which transmit the ultrasonic signals is well-known. Also, various logic device, microprocessor and computer controls for determining the time elapsed between the transmission of an ultrasonic signal and the receiving of a reflected signal are known.

For example, U.S. Pat. No. 4,114,441 shows a method and apparatus for measuring the height of filling materials on a surface, such as within a container, and provides means for determining the time interval between the end of the transmitted pulse from the acoustic transducer, and the end of the reflected or echo pulse.

A problem that has existed in the prior art is determining the levels when the tank is near a full condition. Attempting to detect valid reflected signals when the tank is nearly full is difficult because of a phenomena known as transducer "ring down". Essentially the "ring down" is the tendency of a transducer to continue to vibrate and transmit ultrasonic signals after the control signal that is used for initiating the transmitted signal has ceased. This "ring down" signal decreases in magnitude rather rapidly, but during the time that it is decreasing to a level below the threshold detection level, detection equipment will respond to such "ring down" signals if the signals are above a reference level and thus can indicate that a "ring down" signal is a reflected or return signal when in fact it is not. A common technique to avoid this problem is to blank out all return signals from the input of the detection system for a preselected period of time after initiation of a transmission. The preselected time is determined on various factors including the type of transducer that is used, but during this preselected time no valid returns can be sensed. If the tank is very near full, the return time for a reflected pulse is very short, and if the blanking technique is used, this results in a "dead band". Hence, determination of tank level in the near or very near full condition is not possible.

SUMMARY OF THE INVENTION

The present invention relates to an improved detection system for ultrasonic transducers, wherein the detection system is operative across the range of capacity of the tank, including when the tank is very near full. The present circuitry discloses a circuit which avoids false indications of high levels caused by "ring down", while at the same time provides accurate indications of valid reflected or return signals, in an economical and simple manner.

An ultrasonic transducer is connected to a controller that initiates the transmission of a pulse of ultrasonic energy toward a surface, and a reflected signal returns from such surface. The reflected signal will be delayed by a time proportional to the distance between the transducer and the surface. The transducer output is coupled to circuitry that includes means to provide a reference signal, and after the transmission control signal has been turned off, the reference signal is used for comparison to a return signal, so that the return signal, when larger than the reference signal, will provide an output. Since the local speed of sound is known, the time between transmission of the ultrasonic pulse and sensing of the return ultrasonic pulse is used to calculate the distance from the transducer to the surface.

The present invention includes an adjustable reference signal which immediately after the control signal to the ultrasonic transducer has been stopped is relatively high, and which decreases with time, substantially in proportion to the time needed for the ultrasonic transducer "ring down" signal (vibration occurring after the control or excitation signal has been stopped) to reach the threshold reference signal or zero. During all times the reference signal is maintained at a level such that a valid return signal will be sensed.

The comparison between the transducer signal and the reference signal can be done with an ordinary comparator amplifier or can be accomplished with a microprocessor that establishes a reference signal and receives a transducer signal, or a software program for computer control can be used for providing the same comparison, as well as for controlling the reference signal level during a preselected time period.

The present device, however, eliminates the problems of determining the level when a tank is nearly full, because the output detection system is fully operative even during the short time period following the ceasing of the signal controlling transmitted ultrasonic signal and the return of a reflected signal.

DETAILED DESCRIPTION OF THE PREFERRED EMBODIMENTS

Figure 1:
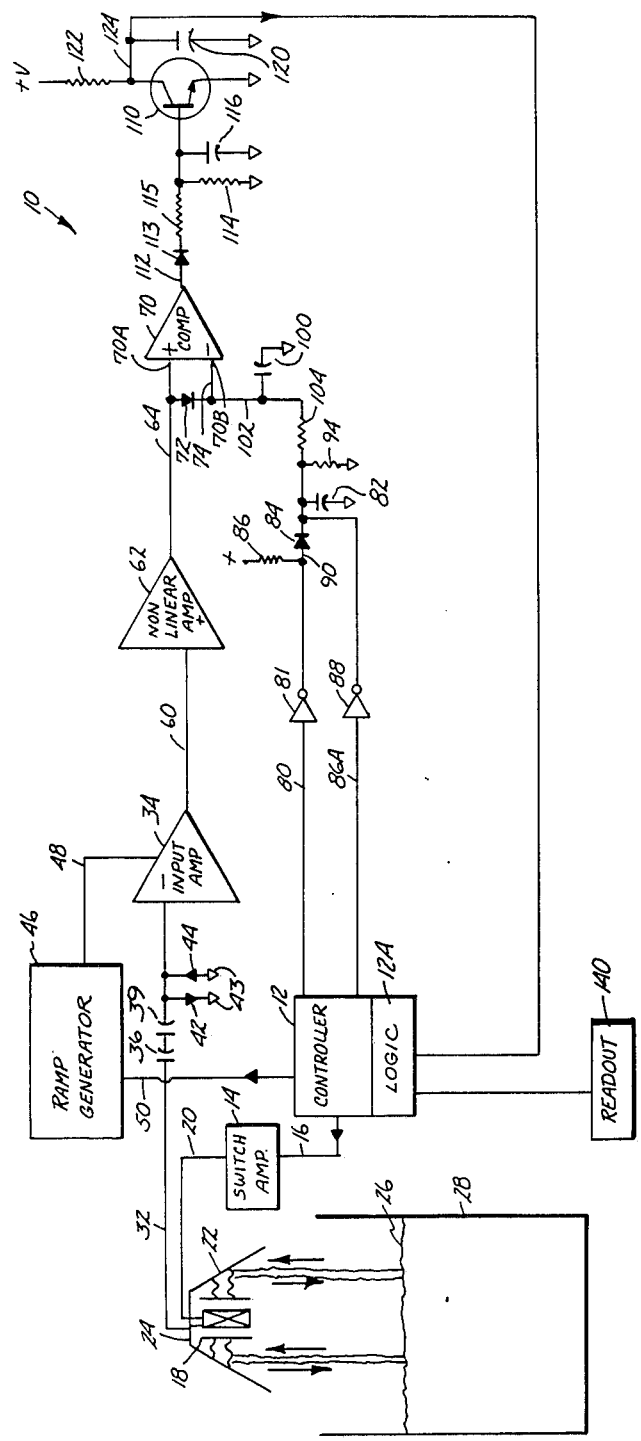
FIG. 1 is a schematic representation of a transducer system circuit made according to the present invention.

With reference to FIG. 1, an ultrasonic level measurement system is shown at 10. A controller 12 is used for initializing ultrasonic signals from a transducer and for measuring the time until the return ultrasonic signal representative of the parameter to be sensed, such as level, is received at the transducer. The controller also includes a logic circuit control portion 12A which is used for determining from such return signal the total transit distance of the ultrasonic transmission. The level of material may then be calculated therefrom. The controller 12 including logic circuit portion 12A may comprise a known power and sequencing controller available commercially. In operation, at a predetermined time, controller 12 outputs an oscillatory signal to drive a switching amplifier 14 through a line 16. Switching amplifier 14 then energizes (or excites) an ultrasonic transducer 18 with a control signal through a line 20, and an ultrasonic signal emanates periodically from transducer 18 to the interior surface of walls 22 of a transducer housing 24. Preferably housing 24 is a conical section fabricated of an ultrasonic reflective material such as spun aluminum. The ultrasonic signal is reflected toward the material including the parameter to be sensed, as shown, a liquid level or reflecting surface 26 in a tank 28. Although a liquid level is shown as the sensed parameter, solid material levels or nonhomogeneous mixture levels of liquids and solids or foam may also be sensed.

A portion of the ultrasonic signal, called the return signal, is reflected from the level or surface 26 and returns along a return path to interior wall 22 of housing 24 and is reflected to transducer 18.

A signal detection system is coupled to transducer 18 by a line 32. While separate lines 20 and 32 are shown in FIG. 1 for coupling transducer 18 to amplifier 14 and input amplifier 34 forming part of the signal detection system, a single line may be used to couple the transducer 18 to amplifier 14 and to an input amplifier 34. Line 32 is coupled to input amplifier 34 through a pair of capacitors 36 and 39 and a pair of diodes 42 and 44, which are connected to circuit common 43, which may be ground. Capacitors 36 and 39 decouple line 32 from input amplifier 34 and diodes 42 and 44, thereby limiting current flow on line 32 to a desired level. Diodes 42 and 44 clamp the signal amplitude when such signals are over a preselected magnitude. Such clamping occurs, for example during the transmit time of transducer 18. The transmit time is the periodic or cycle time interval when the transducer 18 is energized or excited into vibration by a control signal from switching amplifier 14.

In one preferred embodiment, amplifier 34 is a transconductance amplifier and its gain is determined by a ramp generator 46 which is coupled to the input amplifier 34 by a line 48. Ramp generator 46 is controlled by controller 12 along a line 50 and is cycled (the output is ramped up) by the controller 12 during each transmit cycle of transducer 18. Ramp generator 46 then increases the gain of input amplifier 34 with time, proportional to the level of its output on line 48, such that as level 26 recedes from transducer 18, the weaker signals, corresponding to longer transmission and return paths between transducer 18 and level 26, are amplified by a higher gain. The amplitude of return pulses from transducer 18 at the output of input amplifier 34 is thus made more stable with respect to level in tank 28.

The output of input amplifier 34 is coupled by a line 60 to a non-linear amplifier 62 which controls the dynamic range of amplitudes on line 64. Non-linear amplifier 62 preferably is a logarithmic amplifier. The output of non-linear amplifier 62 is coupled by a line 64 to a non-inverting input 70A of a comparator 70, and is coupled through diode 72 and line 74 to inverting input 70B of comparator 70. The threshold of comparator 70 is directly controlled by controller 12 through lines 80 and 86A and inverting logic devices 81 and 88. The outputs of logic devices 81 and 88 are open collector type outputs which control the network comprising resistors 86 and 94, capacitor 82 and diode 84 such that the potential on capacitor 82 is substantially equal to the expected magnitude of the return signal appearing on line 64 except for the "ring down" component thereof. The controller 12 includes circuitry that performs this control function of providing a suitable potential on capacitor 82 based on previous return signals, again except for the "ring down" component thereof.

During transmit time of an ultrasonic signal from transducer 18, the capacitor 82 is charged to a desired level under control of controller 12. After the transmit time, controller 12 controls logic devices 81 and 88 such that capacitor 82 discharges through resistor 94 producing a desired discharge rate. The discharge rate substantially compensates for the reduced expected return signal level at line 64 due to attenuation caused by the distance of travel of such ultrasonic signal. The signal level established by capacitor 82 is provided at signal inverting input 70B of comparator 70.

A capacitor 100 is also coupled to inverting input 70B of comparator 70. When there is a large signal present on line 64 such as during the controlled transmit time of transducer 18 (as controlled by a signal from switching amplifier 14), diode 72 conducts and thus charges capacitor 100 through a line 102. The signal on line 64 then raises the threshold detection level (reference signal level) of comparator 70, as the inverting input 70B of comparator 70 has the signal from line 64 through diode 72 superimposed on (added to) the signal from capacitor 82 at capacitor 100. As the signal on line 64 decays after the transmit cycle, capacitor 100 discharges through resistors 104 and 94. The magnitude of the charge on capacitor 100 is a function of the ultrasonic transmit signal power, and the rate of discharge of capacitor 100 is predetermined, such that it approximates the "ring down" rate of transducer 18; hence, the threshold detection on non-inverting input 70A of comparator 70 will not be substantially affected during the "ring down" of transducer 18 and non-inverting input 70A detects a valid return signal during the discharge period of capacitor 100.

Figure 2:
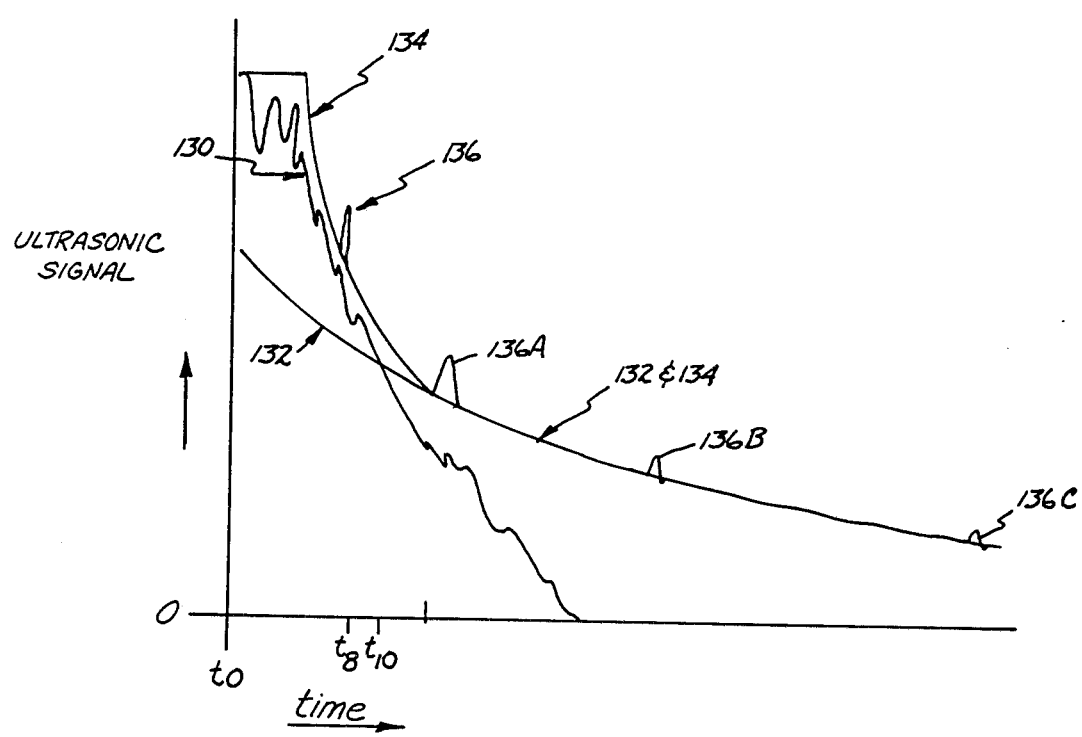
FIG. 2 is a graphical representation of various signals which are present in the circuitry for the ultrasonic system of the present invention.

Referring to FIG. 2, a graph of the magnitude of the ultrasonic signal as a function of time provides for the understanding of the present invention. A first curve 130, starting at time $t_0$ represents the final or end portion of transmission of the controlled ultrasonic signal from transducer 18 under control of the excitation signal from switching amplifier 14. The various ensuing peaks and valleys of curve 130 during the time as it decays toward a magnitude of zero represents the "ring down" of transducer 18. "Ring down" occurs from the transducer 18, which preferably is a piezoelectric crystal, after the controlled signal ceases as the transducer continues to vibrate even after the control signal stimuli from amplifier 14 and controller 12 is removed therefrom. During such continued vibration, ultrasonic signals continue to emanate from the transducer 18.

Curve 132 represents the effect on the threshold reference signal level, as a function of time, as set on inverting input 70B of comparator 70 by only the discharge of capacitor 82. Curve 134 represents the composite threshold magnitude of the reference signal, as a function of time, as set on inverting input 70B of comparator 70 by both capacitor 100 and capacitor 82.

Formerly, during the "ring down" of transducer 18 signals, such as valid return signal peak 136, from transducer 18 at time $t_8$, were either disregarded and handled as only a "ring down" signal or excluded from detection by blocking the return signals, or in other words, not providing for return signal detection until the "ring down" period was completed as at $t_{10}$. Such completion of the "ring down" period was determined by arbitrarily selecting a time such as $t_{10}$ shown in FIG. 2, or thereafter, after which no "ring down" peak was anticipated, or after which any such "ring down" signal had a magnitude sufficiently small so it would not trigger comparator 70. Such disregarded, arbitrarily time rejected signals, those signals prior to $t_{10}$, resulted in the inability to determine when a vessel such as tank 28 was full, or near full, as such disregarded and rejected signals created a "dead band" with no valid return signals.

The instant invention utilizing diode 72, capacitor 100 and resistor 104, when selected as to value and characteristics in accord with the "ring down" characteristic of transducer 18, reject the "ring down" peaks shown in curve 130 but permit valid ultrasonic return signals such as signals 136, to be detected. Accordingly, the measurement of the higher levels of tank 28 is significantly enhanced. Also, lower level return signals, indicating lower material levels in tank 28, such as signals 136A, 136B and 136C, will trigger the comparator 70 because the reference signal level is decreased as a function of time.

Comparator 70 generates a pulse for each cycle of each return signal. Such pulse from comparator 70 is applied to the base of a transistor 110 through a line 112, a rectifying diode 113 and a resistor 115. A capacitor 116 and a resistor 114, which are coupled to ground and to line 112, form an integrator to reject noise spikes that are shorter in duration than the expected duration of valid return signals or pulses. The duration of the return pulse is generally set by the duration and frequency of the transmitted ultrasonic signal. Transistor 110 turns on responsive to such return pulse from comparator 70 and through its collector and emitter discharges a capacitor 120 to ground. Capacitor 120 stays discharged for a period long enough for controller 12 to recognize that the signal on a line 124, which is connected to capacitor 120 and the emitter of transistor 110, as well as to the controller 12, is low. Transistor 110 then turns off when the return pulse duration is over, and capacitor 120 is recharged through a resistor 122 and line 124. Controller 12 then compares the time delay or difference between the initiation of the transmitted ultrasonic signal and the return signal, which through comparator 70 and transistor 110 causes the low signal on line 124 that is sensed by controller 12 and logic circuit portion 12A. Based on the time difference and the local speed of sound and other factors such as characteristics of level 26 and circuit 10 response times, controller 12 then computes the level 26 of tank 28, or in other words, the distance to the reflecting surface 26, in a conventional manner. This level signal is then displayed on conventional readout device 140 through a line 142 or is fed to other devices as desired. The calculations are conventionally done at the present time.

The operation of the disclosed circuitry is easily understood, but is further understood that the principle of the instant invention may now be practiced by replacing the comparator 70 with a calculation means, such as a microprocessor or computer software which may then compare the magnitude of the return signal (at terminal 70A) to the magnitude of a reference signal (at terminal 70B) which has been substantially compensated for "ring down".

Although the present invention has been described with reference to preferred embodiments, workers skilled in the art will recognize that changes may be made in form and detail without departing from the spirit and scope of the invention.

What is claimed is:

1. An improved ultrasonic system for detecting a level of a material in a container having a local speed of sound therein by converting time of ultrasonic transmission into an indication of distance and for providing a level signal to a readout means, including means for measuring the time from transmission of a transmitted ultrasonic signal from ultrasonic transmission means toward the material to receipt of a return signal by second means the measured time representing the level of the material relative to the ultrasonic transmission means according to the local speed of sound, which transmitted signal ceases after a time of transmission, further including means for comparing the magnitude of all received signals to the magnitude of a reference signal wherein the second means detects only the return signal which has a greater magnitude than the reference signal, and including means for adjusting the reference signal to decreasing magnitudes on a time basis after ceasing transmission of a transmitted ultrasonic signal to substantially eliminate detection by the comparing means of signals caused by transducer ring down, and means for converting time measured by the means for measuring time to the level signal supplied to the readout means.

2. An improved ultrasonic system for determining a distance to an ultrasonic reflecting surface comprising:
   ultrasonic transducer means for transmitting ultrasonic signals and controlled to cease transmission of signals after a selected time period but which transducer means continues to vibrate, ring down, and send ultrasonic signals having a decreasing magnitude after the transducer means has been controlled to cease transmission, and including means for receiving ultrasonic signals, the time interval between the transmission of the transmitted ultrasonic signals and the receipt of a respective reflected return signal representing the distance from the transducer means to the ultrasonic reflecting surface;
   reference means coupled to the transducer means for generating a reference signal;
   means coupled to the transducer means for comparing the received signals to the reference signal, and providing a comparator output when a received signal is greater than the reference signal;
   means for controlling the reference signal at a level that is substantially representative of the magnitude of signals which emanate from the transducer means after the transducer means has been controlled to cease transmission, such that signals due to ring down are substantially eliminated as a source of comparator outputs but reflected return signals provide comparator outputs even before ring down ceases; and
   means for measuring the time between the transmission of a transmitted signal and a corresponding comparator output and for providing an indication of the distance from the transducer means to the reflecting surface.

3. An improved ultrasonic system according to claim 2 further comprising controller means coupled to the transducer means for controlling at least one time period for the transmitted ultrasonic signals.

4. An ultrasonic distance measuring system for detecting distance from a transducer to an ultrasonic wave reflecting surface by measuring the time between commencement of transmitting an ultrasonic signal in response to a control signal and the time of receipt of a reflected return signal received by the system, which return signal has a magnitude, the measured time being representative of the distance to the surface, wherein the transducer continues to vibrate and cause reducing magnitude ultrasonic signals for a time after the control signal has ceased, comprising:
   means for comparing the return signal to a reference signal and for providing a comparator output means for providing the reference signal at a controlled magnitude which is greater than the magnitude of the signals from the transducer sensed when the control signal commences transmitting said ultrasonic signal, and which reduces the reference signal as a function of time after the control signal has ceased, to maintain the reference signal magnitude above but substantially corresponding to the reducing magnitude ultrasonic signals caused by the vibration of the transducer after the control signal has ceased; and means for measuring the time between the commencement of transmission of the ultrasonic signal and the corresponding comparator output and for providing an indication of distance from the transducer to the ultrasonic reflecting surface as a function of such time.

5. The ultrasonic distance measuring system of claim 4 wherein said means for providing the reference signal at a controlled magnitude comprises a capacitor which is charged when the ultrasonic signal is being transmitted by the transducer in response to the control signal, and which capacitor is discharged at a controlled rate subsequent to the time that the control signal ceases.

6. A method of measuring the level of a material in a space comprising:

transmitting an ultrasonic signal toward the material level, the ultrasonic signal having a selected controlled duration and the transmitting ceasing after a preselected period of time, the ultrasonic transducer having the characteristic of continuing to vibrate to form a continued ultrasonic signal of decreasing magnitude for a period of time after such transmitting ceases;

providing a transducer output signals from the transducer as a function of signals received thereby subsequent to transmission including ultrasonic signals reflected from the material in the space;

comparing the transducer output signals with respect to a reference signal to determine when an output signal is greater in magnitude than the magnitude of the reference signal and then providing a comparator output;

maintaining the reference signal at a sufficient magnitude which is greater in magnitude than the transmitted signal during transmission of the ultrasonic signal;

thereafter reducing the magnitude of the reference signal to a level as a function of time, so that the reference signal maintains a magntiude higher than the continued ultrasonic transducer output signal magnitude caused by vibration of the transducer after transmission has ceased as the continued ultrasonic signal decreases in magnitude; and measuring the time from initiation of a transmitted signal to receipt of a comparator output representing receipt of a corresponding reflected signal and determining the level of material from such time.

* * * * *